(12) United States Patent  
Morita

(10) Patent No.: US 6,895,284 B2  
(45) Date of Patent: May 17, 2005

(54) SUPERVISORY UNIT AND SUPERVISORY CONTROL SYSTEM PROVIDED WITH THE SAME

(75) Inventor: Kazushige Morita, Hirakata (JP)

(73) Assignee: Matsushita Electric Works, Ltd., Kadoma (JP)

( * ) Notice: Subject to any disclaimer, the term of this patent is extended or adjusted under 35 U.S.C. 154(b) by 539 days.

(21) Appl. No.: 09/950,622

(22) Filed: Sep. 13, 2001

(65) Prior Publication Data

US 2002/0030578 A1 Mar. 14, 2002

(30) Foreign Application Priority Data

Sep. 14, 2000 (JP) ........................................ 2000-279165

(51) Int. Cl.⁷ ............................................. G05B 11/01
(52) U.S. Cl. ............................. 700/19; 700/9; 700/20; 700/17; 700/83; 318/560; 318/561; 318/568.1; 318/568.13
(58) Field of Search ......................... 700/19–20, 17–18, 700/83–86, 87, 88–89, 181, 250, 9; 318/560, 561, 567, 568.1, 568.13, 568.18, 568.23

(56) References Cited

U.S. PATENT DOCUMENTS

| 4,633,385 A | * | 12/1986 | Murata et al. ................. 700/86 |
| 5,220,517 A | * | 6/1993 | Sierk et al. .................. 700/282 |
| 5,301,101 A | * | 4/1994 | MacArthur et al. ............ 700/36 |
| 5,317,606 A | * | 5/1994 | Kinoshita et al. ............ 376/217 |
| 5,798,928 A | * | 8/1998 | Niwa ........................... 700/180 |
| 5,801,945 A | * | 9/1998 | Comer .......................... 700/100 |
| 5,901,246 A | * | 5/1999 | Hoffberg et al. ............. 382/209 |
| 5,939,999 A | * | 8/1999 | Ohgaki ....................... 340/3.51 |

FOREIGN PATENT DOCUMENTS

EP 1162524 A2 * 12/2001 ......... G05B/19/406

* cited by examiner

Primary Examiner—Ramesh Patel  
(74) Attorney, Agent, or Firm—Bacon & Thomas

(57) ABSTRACT

A supervisory control system including a control unit to which an object load is connected and an operation unit, both being connected to each other via a communication line. The object loads can be controlled according to desired various patterning control by sending out a control request signal to the communication line by the operation of the operation unit, a supervisory unit and an operation display unit, which have been developed for use in the supervisory control system. The operation unit, the supervisory unit and the operation display unit are so constructed as to constitute multi stage connection, thus in an application of these units in the manner of multi stage connection, they are easily available for a large scale supervisory control system with many object loads. Further an operation display unit which functions in a reaction display mode, an operation unit, and a supervisory unit with a temporal inhibit function for interlocking movement between the control operation of the operation unit and supervisory action of the supervisory unit, have been developed for users' convenience.

6 Claims, 19 Drawing Sheets

| control unit No. | group address |
|---|---|
| 1 | [G1] |
| 2 | [G1] |
| ⋮ | ⋮ |
| n | [G2] |

*Fig.3*

| address | unit |
|---|---|
| 0 | operation unit_0 |
| 1 | operation unit_1 |
| 2 | operation unit_2 |
| ⋮ | |
| n | operation unit_n |
| n1 | control unit_n-1 |
| n2 | control unit_n-2 |
| ⋮ | |
| nn | control unit_n-n |

*Fig.6a*

| opeartion unit 0 | | opeartion unit 1 | | ----- | opeartion unit n | |
|---|---|---|---|---|---|---|
| control address | control data | | | | control address | control data |
| 1 | ON | ---------- | ----- | | n1 | ON-30% |
| 2 | ON | | | | n2 | ON-50% |
| ⋮ | ⋮ | | | | ⋮ | ⋮ |
| n | ON | | | | nn | ON-70% |

*Fig.6b*

| address | unit |
|---------|------|
| 0 | display unit_0 |
| 1 | display unit_1 |
| 2 | display unit_2 |
| ⋮ | |
| n | display unit_n |
| n1 | control unit_n-1 |
| n2 | control unit_n-2 |
| ⋮ | |
| nn | control unit_n-n |

*Fig.9a*

| display unit 0 | | display unit 1 | | - - - - - | display unit n | |
|---|---|---|---|---|---|---|
| load status inputting means No. | comparison data | | | | load status inputting means No. | comparison data |
| 1 | ON | | | | n1 | OFF |
| 2 | ON | ----------- | | ----- | n2 | ON |
| ⋮ | ⋮ | | | | ⋮ | ⋮ |
| n | ON | | | | nn | ON |

*Fig.9b*

| control unit No. | destination display unit | destination load status inputting means |
|---|---|---|
| 1-1 | 1 | 1 |
| 1-2 | 1 | 2 |
| ⋮ | ⋮ | ⋮ |
| 1-n | 1 | n |
| ⋮ | ⋮ | ⋮ |
| n-1 | n | 1 |
| n-2 | n | 2 |
| ⋮ | ⋮ | ⋮ |
| n-n | n | n |

*Fig.9c*

| address | unit |
|---|---|
| 0 | operation display unit |
| 1 | control unit_1 |
| 2 | control unit_2 |
| ⋮ | ⋮ |
| n | control unit_n |

*Fig.13a*

| control address | control data |
|---|---|
| 1 | ON-30% |
| 2 | ON-50% |
| ⋮ | ⋮ |
| n | ON-70% |

*Fig.13b*

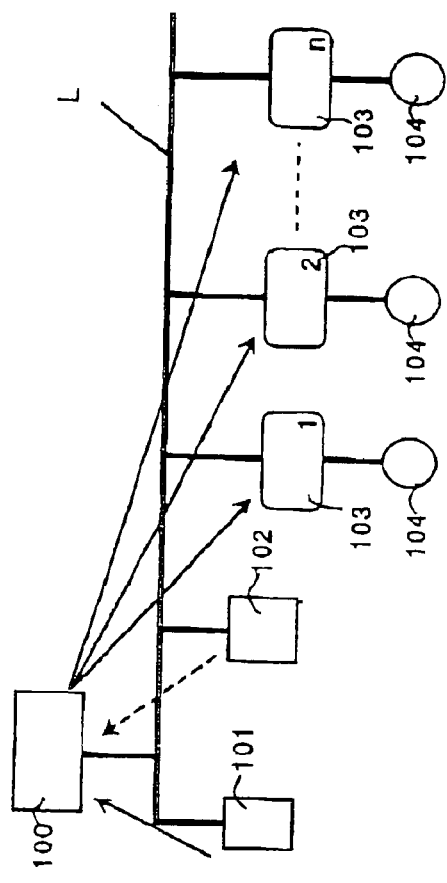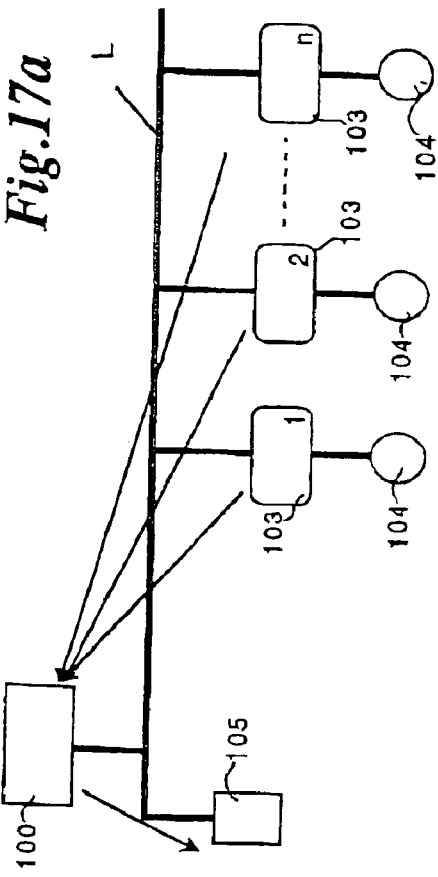

SUPERVISORY UNIT AND SUPERVISORY CONTROL SYSTEM PROVIDED WITH THE SAME

BACKGROUND OF THE INVENTION

1. Field of the Invention

The present invention relates to an operation unit, supervisory unit, display unit, operation display unit and supervisory control system provided with those units. More particularly, the present invention concerns a technique for monitoring and controlling object loads connected to control units and also for displaying the controlled status of object loads which are compared with preset status data or control data after controlling.

2. Description of the Related Art

There has been known a supervisory control system for controlling residential equipment such as lighting apparatus and air conditioner on the basis of operation and supervisory information using an operation unit or a supervisory unit in various buildings such as office buildings. In some kinds of power equipment, for example, the system is so constructed as to start the equipment when an activating request signal is received by a supervisory unit from some other equipment or put an emergency stop to the equipment when a warning signal indicating abnormal heating or other abnormal conditions is received by the supervisory unit. Also, in lighting system, the system is so constructed as to turn on or turn off lighting apparatus every time a switch of the supervisory unit mounted on the wall is pressed.

In those controls, a plurality of loads can also be controlled through one operation or a change in monitoring information. The known methods of controlling a plurality of loads includes group control in which all the loads are controlled in the same status, patterning control in which the loads are respectively controlled in different status (for example, scene control of lighting to create a dark area and a light area etc according to a purpose of use), and on/off patterning control in which each of a plurality of loads is controlled on or off status (for example, partially turning on only some lights during the days to save energy, turning off lights near a projector and turning on the other lights in case the projector is used).

In a certain known supervisory control system, furthermore, the status of load group, patterning, on/off patterning is compared with preset data memorized in advance in memory means on the basis of load condition information from a plurality of control units and the comparison results are displayed on the display unit or the operation display unit.

FIGS. 17a and 17b show the configuration and the operation of the prior art supervisory control system. In the system shown in FIG. 17a, a master unit 100, an operation unit 101, (or an operation display unit having a display section as well as an operation section), a supervisory unit 102 and a plurality (1 to n) of control units 103 are connected via the communication line L.

In case loads 104 connected to the control units 103 are controlled, operation information of the operation unit 101 and information on changes of status in monitored conditions at the supervisory unit 102 are first received by the master unit 100, and thereafter control requests are sent from the master unit 100 to a plurality of the control units 103 on the basis of information stored in the master unit 100.

In the system shown in FIG. 17b, the master unit 100, the display unit 105 (or an operation display unit mentioned above), a plurality (1 to n) of control units 103 connected to a respective loads 104 are connected to each other via the communication line L.

In case the conditions of the loads 104 connected to the control units 103 are displayed on the display unit 105, the master unit 100 receives information on load conditions from a plurality of control units 103, and compares group and patterning conditions and sends their comparison information to the display unit 105 where the information is displayed.

However, there are inevitable restriction with this system, that is the master unit 100 is by all means needed. Accordingly, there arises the possibility that if the master unit 100 is out of order or the communication line L breaks off, it will be impossible to control a plurality of the loads 104 in the whole system.

FIGS. 18a, 18b and 18c show a system which needs no master unit. This system sends out control request signals directly to the control unit 201 from the operation unit 200 (or remote display unit, supervisory unit) via a communication line L.

In this system, the operation unit 200 memorizes the communication address of the control unit 201 and sends control information directly or the control unit 201 memorizes the addresses of the display unit etc. and sends information on load conditions directly. But the one-to-one sending of information, that is, the system is based on an individual control and an individual condition display. But group control is achieved in such a way that the sender unit makes the addresses of the destination unit a group number (group address), whereby the same data is sent to a plurality of units whose group number is preset in advance. FIG. 18a shows an example of individual control, FIG. 18b an example of group control, and FIG. 18c on/off patterning control.

FIG. 19 is a block diagram showing the configuration of the operation unit 200 in on/off patterning control as shown in FIG. 18c. The operation unit 200 comprises a central processing section 210, a communication section 211, a memory section 212 and an operation unit 213. In the memory section 212, the communication address of the control unit 201 to which object loads 202 to be controlled are connected is stored related to control conditions. The communication section 211 is provided with means for outputting a control request signal to each control unit 201.

In the prior supervisory control system above-mentioned, however, some problems remain, that is in executing various control such as patterning control in which a plurality of loads are each controlled in different conditions or on/off patterning control in which a plurality of loads are each on or off controlled, the operation unit or the supervisory unit for sending out control request signals have to memorize the communication addresses of all the control units or of all the object loads connected to each control unit and of all the control conditions desired by users to be executed.

However, unlike the master unit shown in FIG. 17, those units are such small devices that are mounted at different and scattered places, so they are also small in memory storage capacity, therefore they can not be available as they are for large-scale group control, large scale pattering control, or large scale on/off pattering control. Thus it is attempted to execute those controls, there would arise substantial increasing in cost for constitution. In addition, it is of course impossible to execute complicated control to answer users' various needs.

Furthermore, when control checking in display units is attempted to execute for group control, patterning control, or on/off patterning control, there are various restrictions and thus it is impossible any way to perform control checking for large-scale group control, patterning control, on/off patterning control. However, provided that such checking is done, that would substantially increase the cost.

SUMMARY OF THE INVENTION

Accordingly, the present invention has been proposed in view of the above circumstances, and it is an object of the present invention to provide an newly developed operation unit, a supervisory unit, a display unit, an operation display unit and a supervisory control system provided with those units, those are available for large scale and complicated system with so many object loads.

To achieve the foregoing object, the present invention proposes an operation unit, a supervisory unit, a display unit, an operation display unit and supervisory control system incorporating those units which are suitable for monitoring and controlling residential or office equipment, such as lighting apparatus, air conditioners or the like.

The schematic construction of each unit and system proposed as the present invention will be now given below.

The operation unit of the present invention is so constructed as to be connected to control units via a communication line wherein control units are divided into plural groups, with group addresses allocated to respective groups.

This operation unit comprises an operation section for controlling the object load connected to each of the plurality of control units, a memory means on which group addresses for an on-controlled object load and an off-controlled object load with respect to the control unit to be controlled are stored in advance, and a communication/control processing section for sending out via communication line an control request signal given an addition of the group address for an on-controlled object load or the group address for an off-controlled object, both stored in the memory section when the operation section is operated.

The supervisory unit of the present invention is so constructed as to be connected to control units via a communication line where in control units are divided in to plural groups, with group addresses allocated to respective groups.

This supervisory unit comprises a supervisory inputting section for judging the status of an object apparatus by input signal from the object apparatus, a memory section on which a group address for on-controlled object and a group address for off-controlled object with respect to each of the control units to be controlled are stored in advance, and a communication/control processing section for sending out via the communication line a control request signal given an addition of the group address for on-controlled object or the group address for off-controlled object, when judging the change of the object apparatus into on or off status by the input signal received at the supervisory input section. According to such operation unit, it can be performed on/off patterning control of many object loads by memorizing only two group address for on or off controlled object and sending out on or off control request signal given an addition of such group address. Therefore, even if such operation unit is manufactured as small-scale units and constructed to be installed at scattered places, they are well available for large-scale control system with so many object loads without increasing the capacity of the memory and without increasing the cost of equipment and working.

Another operation unit of the present invention is connected via a communication line to a plurality of control units to which object loads are connected and comprises an operation section for controlling the object load connected to each of the plurality of control units, a memory section on which the communication address and the corresponding control data with respect to each of the control units to be controlled are stored in advance, and a communication/control processing section for sending out via the communication line a control request signal given an addition of the address and the control data, when the operation section is operated or when receiving other control request signal via the communication line Another supervisory unit of the present invention is connected via a communication line to a plurality of control units to which object loads are connected and comprises a supervisory inputting section for judging the status of an object apparatus by input signal from the object apparatus, a memory section on which the communication address and the corresponding control data with respect to each of the control units to be controlled are stored in advance, and a communication/control processing section for sending out via the communication line a control request signal given an addition of the address and the control data, when judging the change of the object apparatus into on or off status by the input signal received at the supervisory input section or when receiving other control request signal via the communication line.

Further, the display unit of the present invention is connected via a communication line to a plurality of control units to which object loads are connected, wherein the display unit is allocated a communication address and comprises a display section for displaying the status of the object loads connected to the control units, a memory section on which the communication address and the corresponding status data with respect to each of the control units, and a destination address of other display, or other supervisory unit are stored, and a communication/control processing section for comparing the status data received from each of the control units with the preset status data stored in the memory section, when receiving status data from each of the control units having been controlled via the communication line to display the comparison result data as the comparison result on the display section, and for sending out a control request signal given an addition of the destination address of the other display unit or other supervisory unit to the communication line.

Furthermore, the supervisory control system of the present invention is also proposed wherein the system comprises a control unit to which a object load is connected and the operation display unit of the present invention above-mentioned and/or the supervisory unit of the present invention above-mentioned, which are connected each other via a communication line, wherein the operation unit and/or the supervisory unit send out control request signal to other operation unit or other supervisory unit via the communication line, when it/they receives/receive a control request signal via the communication line.

Still furthermore, the supervisory control system of the present invention is proposed, wherein it comprises a control unit to which object load is connected and the operation display unit of the present invention above-mentioned, connected each other via a communication line, wherein the display unit sends out the comparison result data to other display unit connected to the communication line, when it receives the status data of the object load from the control unit via the communication line.

The operation display unit with functions of an operation unit and of a display unit is still further proposed as the present invention which comprises an operation section for controlling the object loads connected to each of the plurality of control units, a display section for displaying the status of the object loads connected to the control units, a memory section on which the communication address and the corresponding control data with respect to each of the control units are stored in advance, and a communication/control processing section for sending out a control request signal given an addition of the communication address and the preset corresponding control data stored in the memory section to the communication line and for comparing the status data of the object loads received from each of the control units with the corresponding control data stored in the memory section, when receiving the status data of the object load from each of the control units having been controlled by the operation display unit via the communication line and for thereafter displaying the comparison result data as the comparison result on the display section.

Another operation display unit of the present invention is so constructed as to be changed into reaction display mode to display comparison result data on the display section thereof, when control request signal is received at its communication section.

Still another operation display unit of the present invention is so constructed to be changed into reaction display mode on its display section when control request signal is received at its communication section and to display comparison result data when the status data of the object loads are received from all of the control units.

The supervisory control system of the present invention proposed here at the same time is constructed by connecting the control units to which object loads are connected and the operation display units, connected each other via the communication line wherein the control unit comprises a control section for controlling the object loads, a memory section on which a communication address of the control unit is stored in advance, a supervisory section for supervising the status of the object loads, a communication/control processing section for controlling the object loads when receiving a control signal via the communication line and for detecting the status of the object loads having been controlled to send out the status data of the loads given an addition of the communication address stored in the memory section.

According to this system, the operation display unit is changed into the reaction display mode when it sends out a control request signal given an addition of the communication address and the corresponding data with respect to the control unit to be controlled by operation of the operation section and thereafter displays comparison result data obtained from comparison of the status data of the object loads with the preset corresponding control data.

Furthermore another improved operation unit is connected via a communication line to a plurality of control units to which the object loads are connected and comprises an operation section for controlling the object loads connected to each of the plurality of control units, a memory section on which the destination address for control request signal is stored in advance, and a communication section for sending out control request signal given an addition of the destination address stored in the memory section to the communication line when the operation section is operated, for invalidating the operation of the operation section when receiving operation inhibit signal via the communication line and for removing the invalidation to permit to send out of control request signal when receiving an operation permission signal.

In still further another improved operation unit, the unit is connected via a communication line to a plurality of control units to which object loads are connected and comprises a supervisory inputting section for judging the status of an object apparatus by input signal from the object apparatus, a memory section on which the destination address for control request signal is stored in advance, and a communication/processing section for sending out via the communication line a control request signal given addition with the destination address, when judging the change of the object apparatus into on or off status by the input signal received at the supervisory inputting section, for invalidating the operation of the operation section when receiving operation inhibit signal via the communication line and for removing the invalidation to permit to send out the control request signal when receiving an operation permission signal.

BRIEF DESCRIPTION OF THE DRAWINGS

FIG. 3 shows setting examples of group addresses.

FIGS. 6a and 6b show setting examples of an address in each unit and examples of a storage data in each operation unit.

FIGS. 9a, 9b and 9c show setting examples of an address in each unit, examples of a storage data in each display unit and examples of a storage data in each control unit.

FIGS. 13a, and 13b show setting examples of an address in each unit and examples of a storage data in an operation display unit.

FIGS. 17a and 17b is a diagram showing an embodiment of a configuration and operation of a conventional supervisory control system.

DESCRIPTION OF THE PREFERRED EMBODIMENTS

Figure 1:
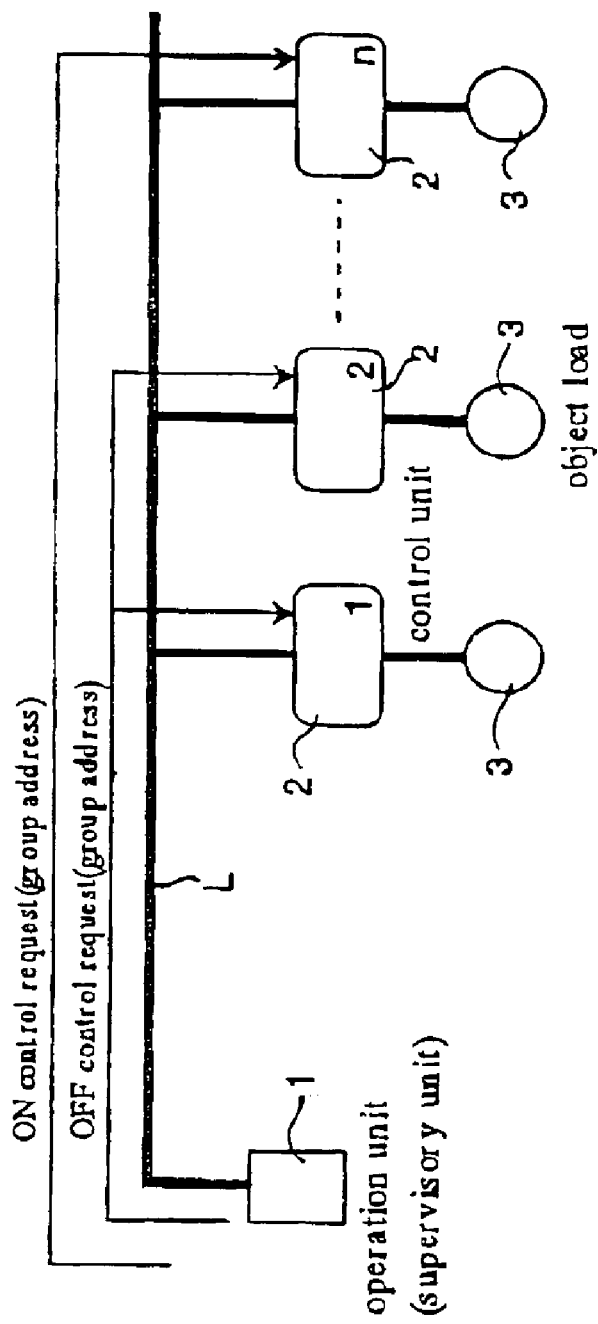
FIG. 1 is a diagram showing an embodiment of the configuration of a supervisory control system.
Figure 2:
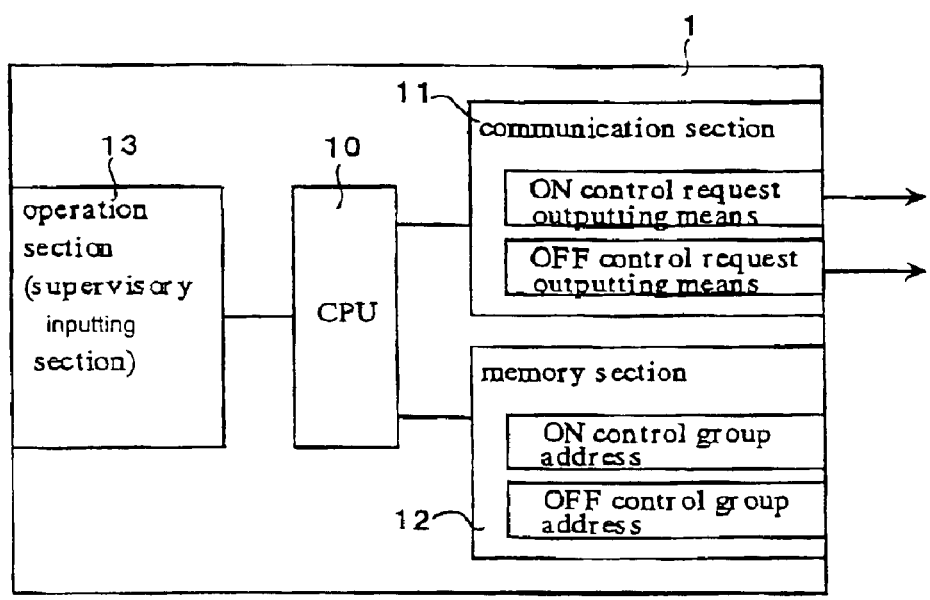
FIG. 2 is a block diagram showing an embodiment e of the inner configuration of an operation unit.

Now, the preferred embodiments of the present invention will be described with reference to the drawings wherein FIG. 1 is a diagram showing an embodiment of the configuration of a supervisory control system and FIG. 2 is a block diagram showing an embodiment of the inside arrangement of an operation unit.

The supervisory control system comprises an operation unit 1 and a plurality of control units 2 (as shown at n in FIG. 1) which are connected to each other through a communication line L and each of the control units 2 is connected to an object load 3. In the following description, a lighting equipment will be cited as the load 3.

As shown in FIG. 2, the operation unit 1 comprises a central processing section 10 constituted by CPU or the like, a communication section 11 to control communication via the communication line L, a memory section 12, an operation section 13 for on/off patterning control of the loads 3 connected to each of a plurality of the control units 2 wherein the communication section 11 and the central processing section 10 constitute a communication/control processing section. In the memory section 12, the group addresses [G1] for on-controlled objects and the group addresses [G2] for off-controlled objects are memorized in advance.

Figure 3:
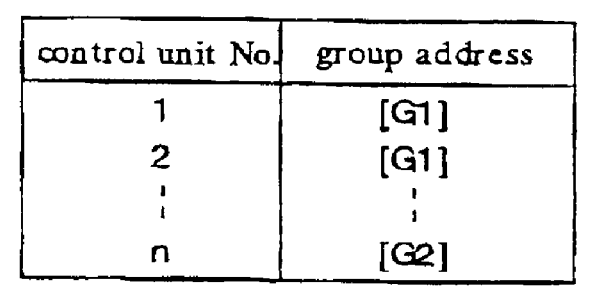

Also in each of the control units 2, a group address is set and memorized in advance as shown in FIG. 3. That is, a plurality of control units 2 are divided into groups and the proper group addresses are allocated to each group.

According to such construction, when the operation section 13 in the operation unit 1 is actuated, on control request signals and off control signals are respectively added to the group addresses [G1], [G2] and are sent out from the communication section 11 to the communication line L in accordance with the data preset in advance in the memory section 12.

Here, the control units 2 of which the control unit numbers are "1" and "2" are allocated group addresses of [G1] and their addresses are memorized in the memory section, thus they turn on the object loads 3 when they receive on control request signals, whereas the control unit of which the control number is "n" is allocated group address [G2] and its address is memorized in the memory section, thus it turns off the object load 3 when it receives off control request signal, whereby on/off patterning control of lighting loads (selective lighting control) can be performed.

According to such operation unit 1 as described above, on/off patterning control can be performed by sending out only two group addresses to the communication line L, which are divided for on controlled objects and off controlled objects in advance, together with a control request signals.

Therefore, even if small-scale operation units so constructed as to be installed at scattered necessary places are employed, a large-scale system with large amount of object loads can be easily built without increasing the cost of equipment and working, since the capacity for storing addresses is not required to be increased Further, according to this system, it is not required provide a master unit like the conventional supervisory control system (refer to FIG. 17), and thus there is no fear that the whole control system may be broken down due to the trouble of the master unit or the breaking off at the one point of the communication line around the master unit.

Furthermore, the supervisory control system shown in FIG. 1 can be employed by connecting it to the communication line L instead of the operation unit 1. The inner configuration of the supervisory unit is the same as that of the operation unit 1 shown in FIG. 2 and the only difference between them is that a supervisory inputting section for determining the status of object apparatus by inputting signals therefrom is provided instead of the operation section 13.

On the other hand, the supervisory unit judges the change into an on status of the object apparatus (for example, a contact point is change from off status to on status) by inputting signals from the supervisory inputting section sent from the object apparatus and thereafter sends out via a communication line L an on control request signals to on-controlled objects together with on group addresses and off control request signals to off-controlled objects together with off group addresses.

Accordingly, an on/off patterning control of lighting loads (selective lighting control) can be easily performed. Such supervisory unit can be applied to various patterning control by only storing two kinds of addresses in the memory means, i.e. on control group addresses for on-controlled objects and off control group addresses for off-controlled objects, and by sending out on or off control signals to the communication line L.

Therefore, even if the supervisory units is as such one as to be small in size and to be installed at scattered necessary places, such supervisory unit can be applied to built a large-scale supervisory control system without increasing the memory capacity and without increasing the cost of equipment as well as that of working.

Figure 4:
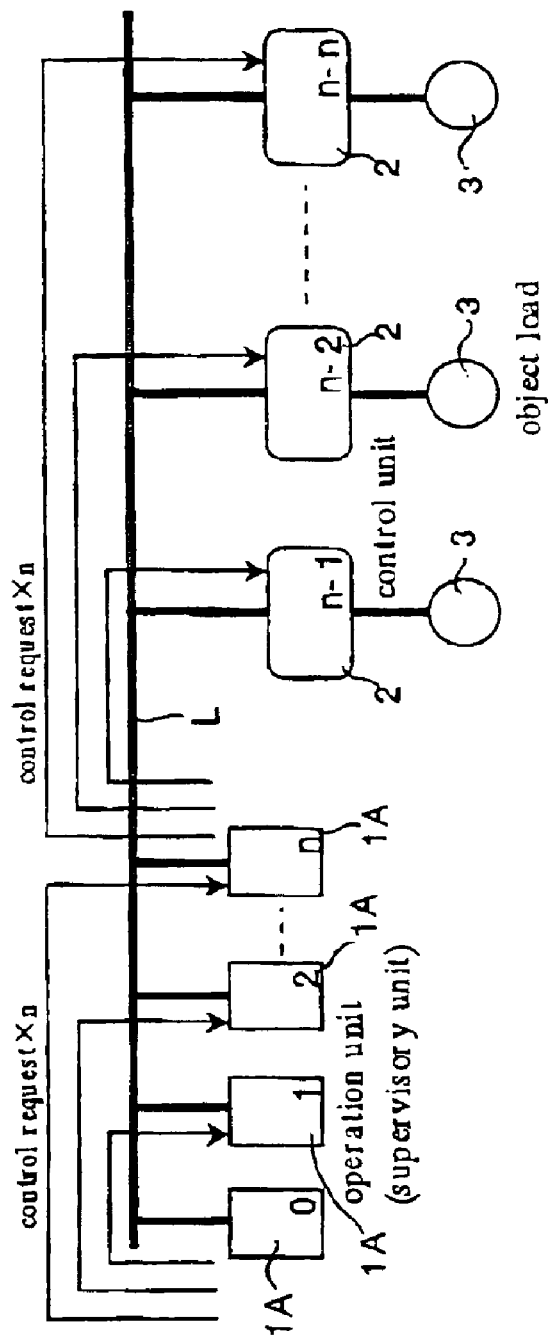
FIG. 4 is a diagram showing alternative embodiment of the configuration of a supervisory control system.
Figure 5:
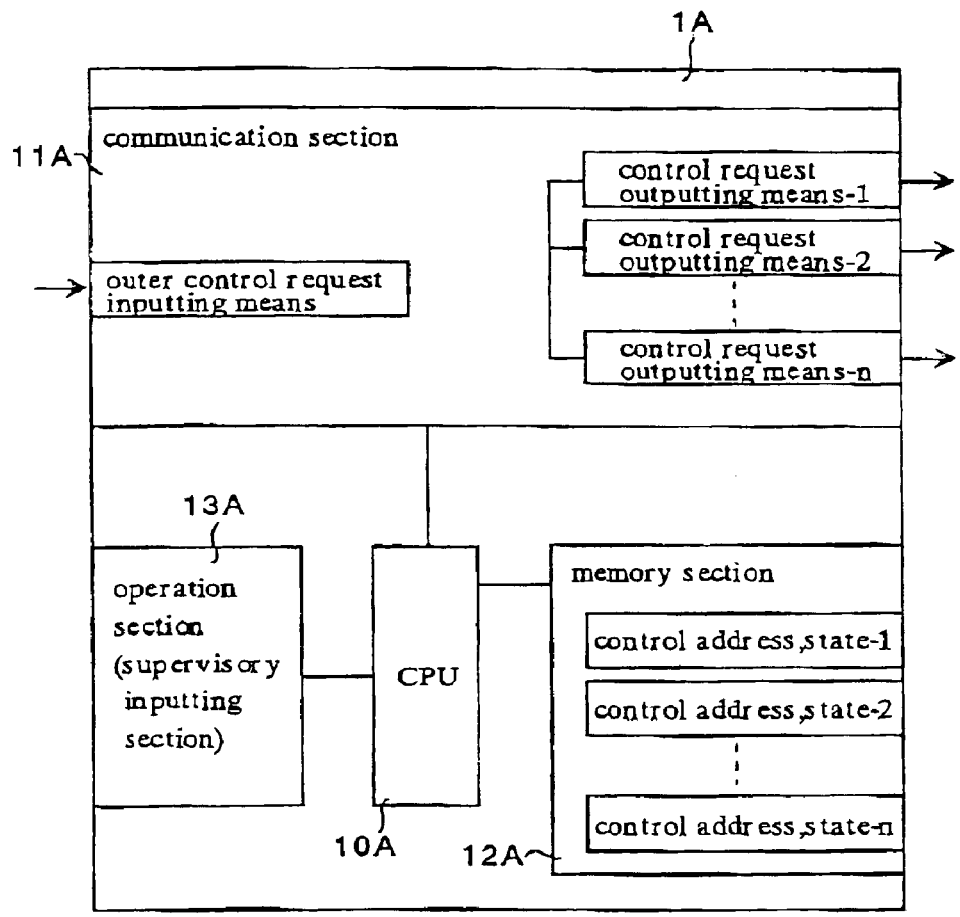
FIG. 5 is a block diagram showing alternative embodiment of the inner configuration of an operation unit.

Next, another configuration of the supervisory control system is shown in FIG. 4. FIG. 5 is a block diagram showing an embodiment of the inner configuration of the operation unit in the system shown in FIG. 4. As shown in FIG. 4, the supervisory control system comprises a plurality of operation units 1A and a plurality of control units 2 which are connected via a communication line L, and object loads 3 are connected to the control units 2 respectively.

As shown in FIG. 5, the operation unit 1A comprises a central processing section 10A constituted by CPU or the like, a communication section 11A for controlling communication signals through the communication line L, a memory section 12A and an operation section 13A for controlling the object loads 3 connected respectively to the plurality of control units 2. The communication section 11A and the central processing section 10A constitute a communication/control processing section.

The memory section 12A stores in advance the communication address and the corresponding control data with respect to each of the control unit to be controlled. The memory capacity can't be increased because the operation unit 1A is small and constructed as to be installed at various operation locations in a building. Thus the information to be memorized therein is limited to the amount reflecting the number "n" of control units to be controlled.

The operation unit 1A sends out control request signals given in addition with the communication addresses and the corresponding data, both memorized in the memory section 12A, to the communication line L, when the operation section 13A is operated or when another control request signal is received via the communication line L.

Now, an embodiment of a supervisory control system will be explained. In this embodiment, the addresses of each unit in the supervisory control system are set as shown in FIG. 6a and the addresses and the corresponding control data for the control unit to be controlled are preset and stored in each operation unit 1A as shown in FIG. 6b.

In this embodiment, when the operation section 13A of the operation unit "0" is actuated, control request signals are sent out to the respective addresses "1," "2," ..., "n" from the communication section 11A in accordance with the preset data stored in the memory section 12A.

In reply to these, the operation units "1," "2," ..., "n" receive the control request signals at the outer control request inputting means of the communication section 11A respectively then send out control request signals together with the communication addresses and the corresponding data to the communication line L in accordance with the preset data stored in each memory sections 12A.

Namely, explaining by reference to the sample shown in FIG. 6, in the operation unit "n," the corresponding data of "ON—30%", "ON—50%, ... and "ON—70%" are respectively allocated to the communication addresses of "n1", or "n2", ... "nn" and they are sent out to the communication line L together with control request signals, whereas in the control units 2 when they receive these request signals, they control the corresponding object loads 3 (lighting load) in accordance with the control data sent from the operation units.

According to such supervisory control system, if two operation units 1A "1", "2", which are to be provided as subdivided ones, are connected to the operation unit 1A "0" which is to be provided as a dominant one in the manner of double connection, the patterning control will be able to be executed in many variations so many as the combination of the number of the square of n (in case n=10, 100 variation is possible) in lighting pattern control. It should be noted that such multi stage connection of the operation units is not limited to the double stage connection, but may be expanded more, i.e. triple, quartet, quintet stage connection. In addition, such control is not limited to patterning control of a lighting system but may be applied to various group control, on/off patterning control etc.

Even if the operation unit 1A installed in each room is small in size and low in cost but applied to only a small number of loads, they can be applied to build a large scale system such as the whole floor control system and the whole building control system by connecting the operation unit provided as dominant one at their preceding places or further preceding places, i.e. such as in the elevator hall and in a common area like the building entrance. Even in case the loads 3 provided at a plurality of places are controlled, all that has to be done is to send a control request signals to the operation unit 1A provided as dominant one at the preceding places or to actuate such dominant operation unit 1A.

In this supervisory control system, when the dominant operation unit 1A receives control request signals via the communication line L, it sends out the control request signals to the subdivided operation unit 1A (or supervisory unit) via the communication line L.

The supervisory control system as shown in FIG. 4 does not require to provide a master unit like the conventional supervisory control system (refer to FIG. 17), and thus there is no fear that the whole control system may be broken down due to the trouble of the master unit or the breaking off at the one point of the communication line around the master unit.

Further, the supervisory control system shown in FIG. 4 can be built by connecting the supervisory unit to the communication line L instead of the operation unit 1A. The configuration of the supervisory unit is the same as that of the operation unit 1A shown in FIG. 5 and the only difference is that there is provided a supervisory inputting section to determine the status of object apparatus to be supervised by inputting signals from the object apparatus instead of the operation section 13A.

When the supervisory unit judges the change into on status of the object apparatus (for example, the change from off status to on status of a contact point) by inputting signals from the supervisory inputting section, or when it receives control request signals via the communication line L, it sends out via the communication line L control request signals given in addition with the communication data and the corresponding control data, both memorized in the memory section 13A.

In such systems, when the supervisory unit is such one as to be able to control only n pieces of loads, if they are connected in a manner of multi stage connection as abovementioned, such as m stage connection, the patterning control, group control, and on/off patterning control can be extendedly executed up to the number as many as the number of m-th power of n of loads.

Figure 7:
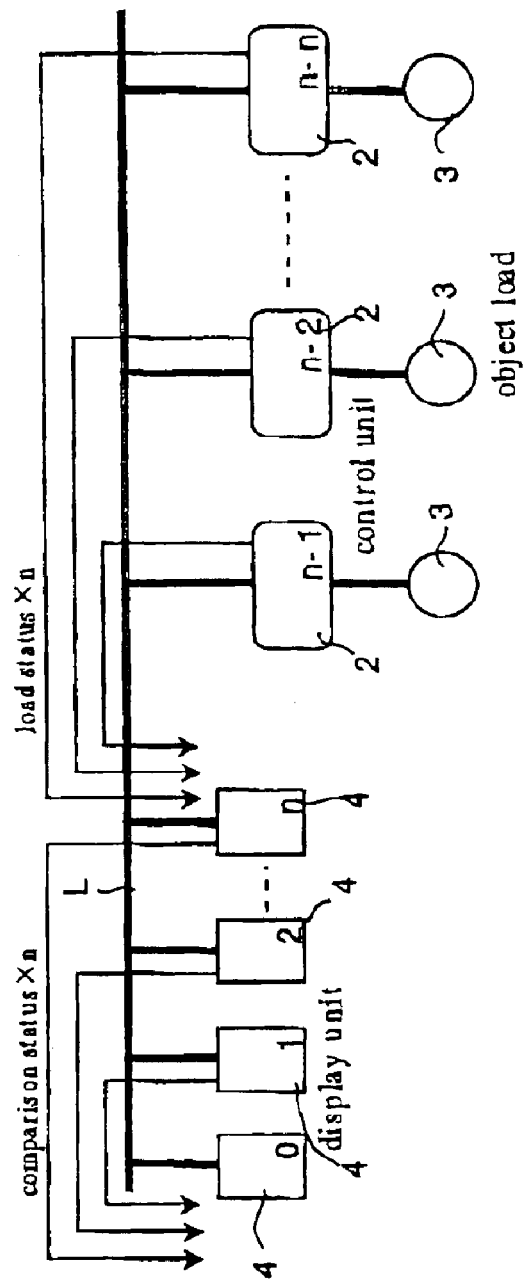
FIG. 7 is a diagram showing still other embodiment of the configuration of a supervisory control system.
Figure 8:
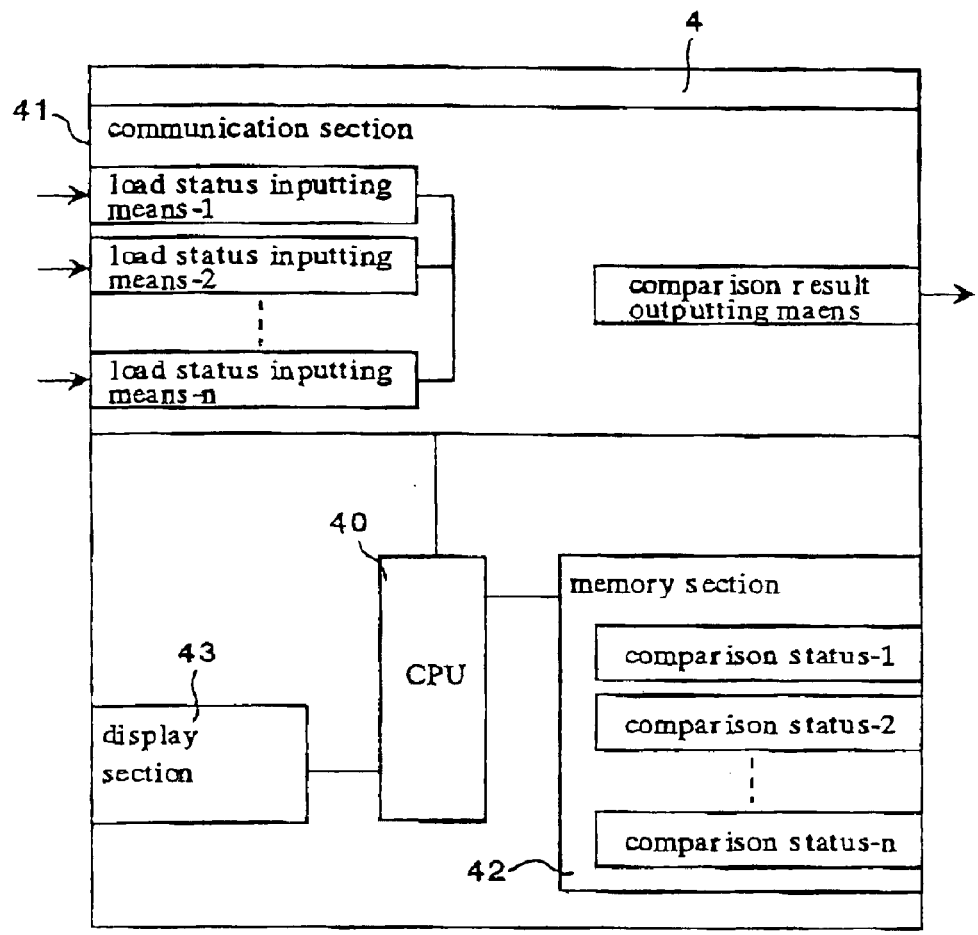
FIG. 8 is a block diagram showing the inner configuration of a display unit.

Next, FIG. 7 is a diagram showing still other embodiment of the configuration of a supervisory control system. FIG. 8 is a block diagram showing the inner configuration of a display unit in FIG. 7. As shown in FIG. 7, the supervisory control system comprises a plurality of display units 4 and a plurality of control units 2, each connected via the communication L. Each of the control units 2 connect to object loads 3.

As shown in FIG. 8, the display unit 4 comprises a central processing section 40 consisted by CPU, a communication section 41 for controlling communication signals transmitted via the communication line L and a memory section 42 and a display 43 for displaying the object load 3 connected to the plurality of the control units 2 wherein the communication section 41 and the central processing section 49 constitutes communication/control processing section. The memory section 42 stores the communication address and the corresponding status data as the comparison data and the destination address for sending the status data of the object loads.

Namely, the memory section 42 stores preset data for checking for respective load status inputting means of the communication section 41. Since the display unit 4 is installed at various display places in a building, its memory capacity can't be increased and it is constructed as to store up to the number reflecting "n" pieces of units.

When the display unit 4 receives the status data of the object loads via the communication line L, it compares with the preset data for checking stored in the memory section 42 and displays the comparison result data on the display 43 and also sends out the comparison result data to the destination address also stored in the memory section 42.

For example, the communication address of each unit in the supervisory control system as shown in FIG. 7 and the preset data for checking memorized in each display unit 4 (its configuration is shown in FIG. 8) can be preset as shown in FIG. 9a and FIG. 9b respectively.

And in addition to such presetting, each control unit 2 is so constructed as to send out the status data of the object loads 3 to another display unit 4 when the status of the object load 3 is changed or when the predetermined time passes.

When receiving the status data of the load, the display unit 4 compares the data with the preset data for checking. For example, in the display unit of "n", it judges all agree when the data which is received at load status data inputting means 1 is off status data and the data which are received at load status data inputting means 2-n are off status data.

And the display unit of "n" displays red indication for only all agreement and green indication for other status as the comparison result data and concurrently sends out ON data, when judged all agreement and OFF data, when judged other status to the communication line L as the comparison result data for another display units or host controller.

In such system, the display unit of "0," provided as dominant one receives at the load status data inputting means of "1," "2," . . . , "n" the comparison result data from display units of "1," "2," . . . , "n" provided as subdivided one, where the comparison result data are compared with the preset data for checking memorized in memory section 42 provided in the display unit of "0," and after this comparison the display section 43 displays red indication for all agreement, i.e., ON data is sent from all the subdivided display units and green indication for other than that.

As set forth above, the display unit 4 which can check only n pieces of loads in the supervisory control system shown in FIG. 7 is arranged in the form of double stage construction, the square of n pieces (in case n=10, 100 pieces) of lighting loads can be on/off pattern checked. The arrangement of the display unit 4 is not limited to 2-stage construction but may be three or more stages construction. It is noted that such control is not limited to on/off pattern checking of lighting but may be applied to various modes of pattern checking or group checking (for example, another loads will be turned on if one of the loads 3 is on). Furthermore, the function of the operation unit may be incorporated into the display unit 4 and such a unit may be applied as an operation display unit instead of the display unit 4.

According to the supervisory control system, when the control unit 4 receives object load status via the communication line L, it sends out the comparison result data of the control pattern to other display unit 4 via the communication line L.

For example, even when the display unit 4, although which is so constructed as to be installed in each room is small and low in cost but applied only to checking the controlled result for small scale system, they are easily applied to checking the controlled result for the large scale control system such as the whole floor or the whole building system, it they are connected to other display unit 4 which is provided as a dominant one at a common area like in the elevator hall and in the building entrance, Also in case that the same comparison is executed, if the reference data for checking the controlled result is stored in the display unit 4 provided as a dominant one , the display unit provided as subdivided one can receive it and performed the same displaying.

In the supervisory control system as shown in FIG. 7 since a master unit as like in the conventional supervisory control system (refer to FIG. 17) are not required, there would be no fear that the whole system is broken down because the master unit happens to get out of order or breaking off causes around the master unit at the communication line.

Figure 10:
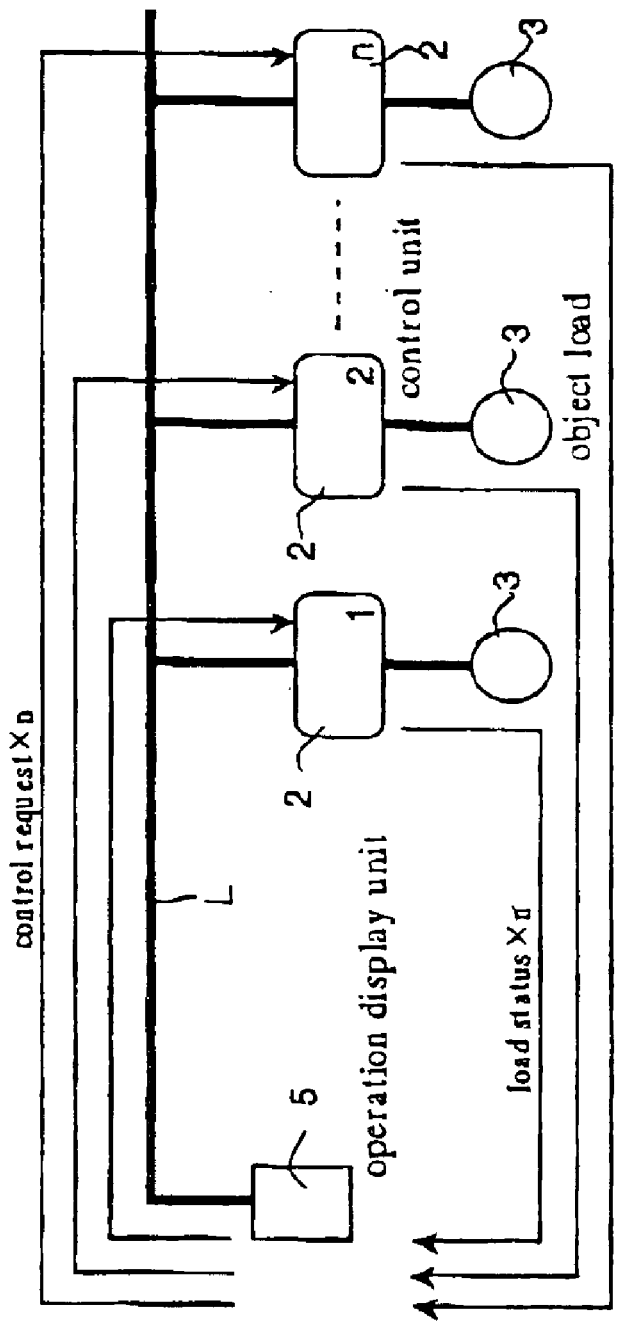
FIG. 10 is a diagram showing alternative embodiment of the configuration of a supervisory control system.
Figure 11:
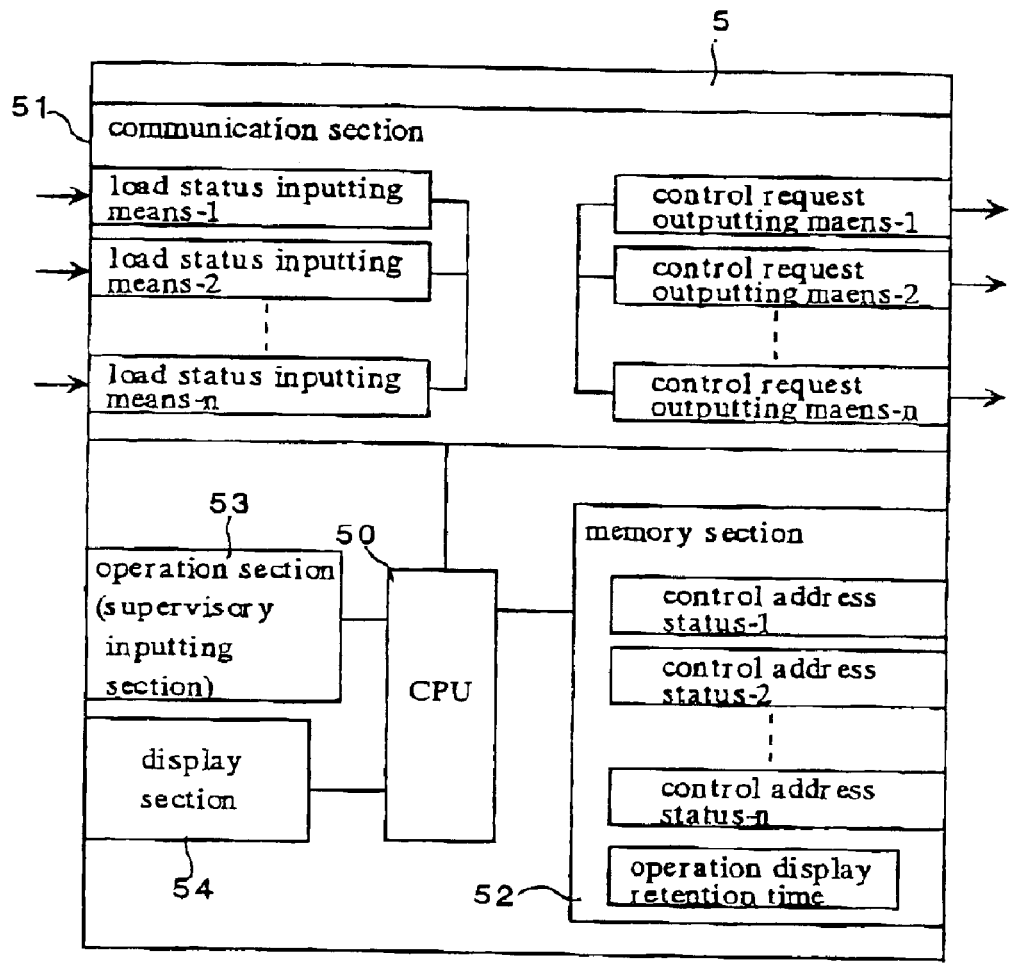
FIG. 11 is a block diagram showing an embodiment of the inner configuration of an operation display unit.
Figure 12:
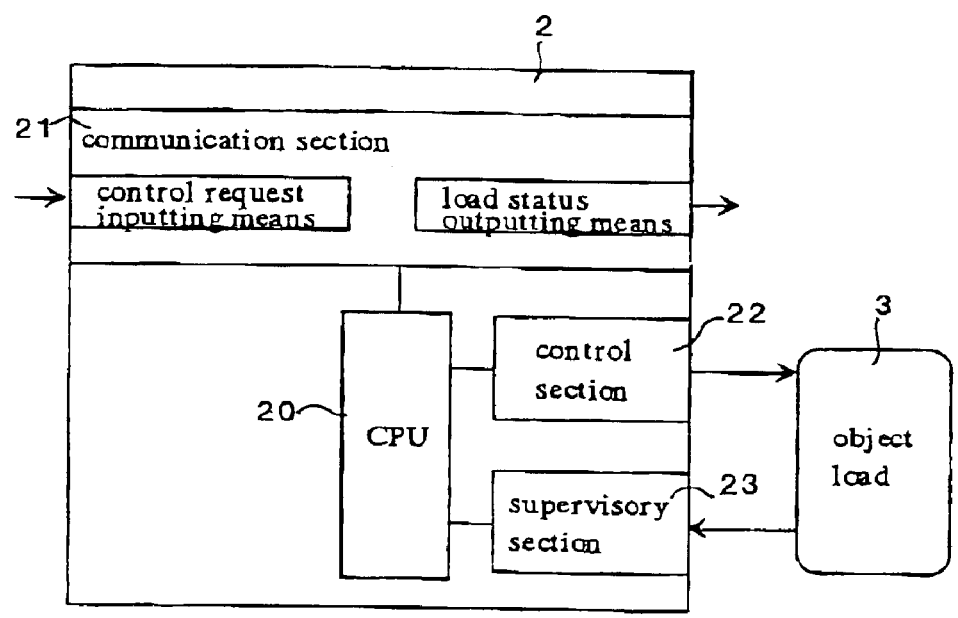
FIG. 12 is a block diagram showing an embodiment of the inner configuration of a control unit.

FIG. 10 is a diagram showing still further example of the configuration of a supervisory control system. FIG. 11 is a block diagram showing an example of the inside arrangement of an operation display unit in FIG. 10. FIG. 12 is a block diagram showing an example of the inside arrangement of a control unit in FIG. 10. As shown in FIG. 10, the supervisory control system is comprised of an operation display unit 5 and a plurality of control units 2. They are connected by a communication line L and an object load 3 is connected to each one of the control units 2.

As shown in FIG. 11, the operation unit 5 comprises a central processing unit 50 which may be constituted by CPU, a communication section 51 for processing communication signals transmitted through a communication line L, a memory section 52, an operation section 53 which is operated for controlling a plurality of control unit to which object load 3 is connected and a display section 54 on which the status data of the object loads 3 connected to a plurality of control units 3, wherein a communication section 51 and CPU 50 constitute a communication/control processing section and the communication address and the corresponding control data with respect to the control units 3 to be controlled are stored in advance in the memory section 52.

The control unit 2 is provided with a central processing section 20 consisting of CPU, a communication section 21 for controlling communication via the communication line L, a control section 22 for controlling the connected load 3 and a supervisory section 23 for supervising the status of the connected load 3 as shown in FIG. 12. The communication section 21 and the central processing section 20 constitute a communication/control processing section.

When the operation section 53 is operated, the operation display unit 5 sends out control request signals given addition with the communication address and the corresponding data, both memorized in the memory section 52. Then, the unit 5 receives the status data from the object load, and compares the received data with the preset data for checking stored in the memory section 52 and displays the comparison result data on the display 54.

on the other hand, the control unit 2 stores the communication address of the operation display unit 5 in advance. When the unit 2 receives control request signals via the communication line L, it control the control load 3 by a control section 22, then detects the status of object load in the supervisory section 23, thereafter sends out the status data of the object load given addition with the communication address of the operation display unit 5 to be destination.

The communication address of each unit in the supervisory control system of FIG. 10 may be set as shown in FIG. 13a and the communication address and the corresponding control data may be set and memorized as shown in FIG. 13b in the operation display unit 5.

In such a case, when the status data of the object load is received in the load status inputting means in the communication section 51, the operation display unit 5 compares the received data with the preset control data stored in the memory section 52 and displays red indication for all agreement and green indication for other than that.

Now the basic operation of the system will be given below. The system begins first such condition that the display section 54 of the operation display unit 5 is on green indication because the preset control data stored in memory section 52 does not agree with the status of the object data sent back form the control units 2 thus all agreement is not achieved.

From such condition the operation section 53 of the operation display unit 5 is operated, then the unit 5 is changed into such condition that the display section 54 executes reaction display mode, or displays red indication indicating that the operation is temporally received and then enters such mode that the comparing with preset data is not executed even when the status data of the object loads at load status inputting section is received.

Next, in accordance with the preset data in the memory section 52, the operation display unit 5 sends out control data of "ON—30%" to "control address 1," "ON—50%" to "control address 2" and "ON—70%" to "control address n" from its communication section 51 respectively. Then the respective control units 2 which receive them control the load 3 in accordance with the respective control data and thereafter detect the status of the loads 3 immediately to send out the status data of the object loads 3 to the load state inputting means in the operation display unit 5 from the load state outputting means in the communication section 21.

As a result, when the operation display unit 5 confirm that the status data of the object loads 3 are received from the all control units 2 to which the operation display unit sends out control request signals, the operation display unit 5 return normal mode and executes comparison with preset data to display the comparison result data on the display section 54.

Namely, when the controlled result agrees with preset data for checking, red indication is displayed, whereas when there are some object loads 3 which can not be controlled, green indication is displayed, however operation display unit any way returns to normal display mode of indicating the comparison result data after controlling.

In this case, operation display holding time which is set considering the time during which the status data of the object loads 3 are sent back to the operation display unit 5 from the control units 2 after the operation of the operation display unit 5 may be set as returning condition to normal display mode instead of setting the time when the operation display unit 5 confirm that the status data are sent back from all the control units 2 to which the operation display unit 5 sends out control request signals as returning condition And during such operation display holding time the status data received form the control units 2 are memorized and returns normal display mode to display the comparison result data after the operation display holding time passes.

It should be noted that where such operation display holding time is set in the operation display unit 5, the operation display unit 5 may be returned normal display mode when the operation display holding time passes even if the status data are not sent back to the operation display unit 5 due to some trouble which may happen to cause in the control units 2 or break off at some places in the communication line L.

Such a display section 54 may be constructed in such a manner that the display is changed into a reaction display mode when a controlling request is sent out by the communication section 51, and it shows the comparison result of the status data of the load 3 is displayed. The display 54 may be also constructed in such a manner that it displays the comparison result data of the control status of the load 3 when all load status is returned after being changed into the operation reaction display or it displays the comparison result data after a fixed time is passed even if the status data is not returned from all of the load after being changed into the reaction display mode.

Since such a display operation unit actuates, an operation reaction display in the display section 54 as soon as the operation section 53 is operated, the operator can recognize the operation to avoid re-operation by mistake.

After the completion of the control, the display operation unit can be immediately returned to a normal status display of the load. Even if the control of the load 3 is not completed correctly (control failure), it can be immediately confirmed and appropriate countermeasure can be taken.

The supervisory control system shown in FIG. 10 does not require a master unit like a conventional supervisory system (see FIG. 17), so that there is no fear that the master unit may get out of order or one trouble like the breaking off of the communication line around the master unit can paralyze the whole system.

The operation display unit 5 which executes a predetermined lighting pattern control when the operation section 53 is operated is explained in the above, however, the present invention is not limited to such a unit and an on/off pattern control, an individual control repeating on/off each time of operation or a group control may be applied.

Furthermore, if a supervisory display unit having a supervisory inputting section of a supervisory unit may be constructed in place of the operation section 53 of the operation display unit 5, such a system may be operated as mentioned above. That is, when the change of the objective monitoring apparatus into an on condition is judged by inputting signals from the supervisory inputting section and a control request signals are sent by the communication section, the display section 54 may be changed into the operation reaction display at a fixed time. After the fixed time or when the fixed time isn't passed, if the status data of all the load is returned, the comparison result information of the display section 54 may be displayed.

Figure 14:
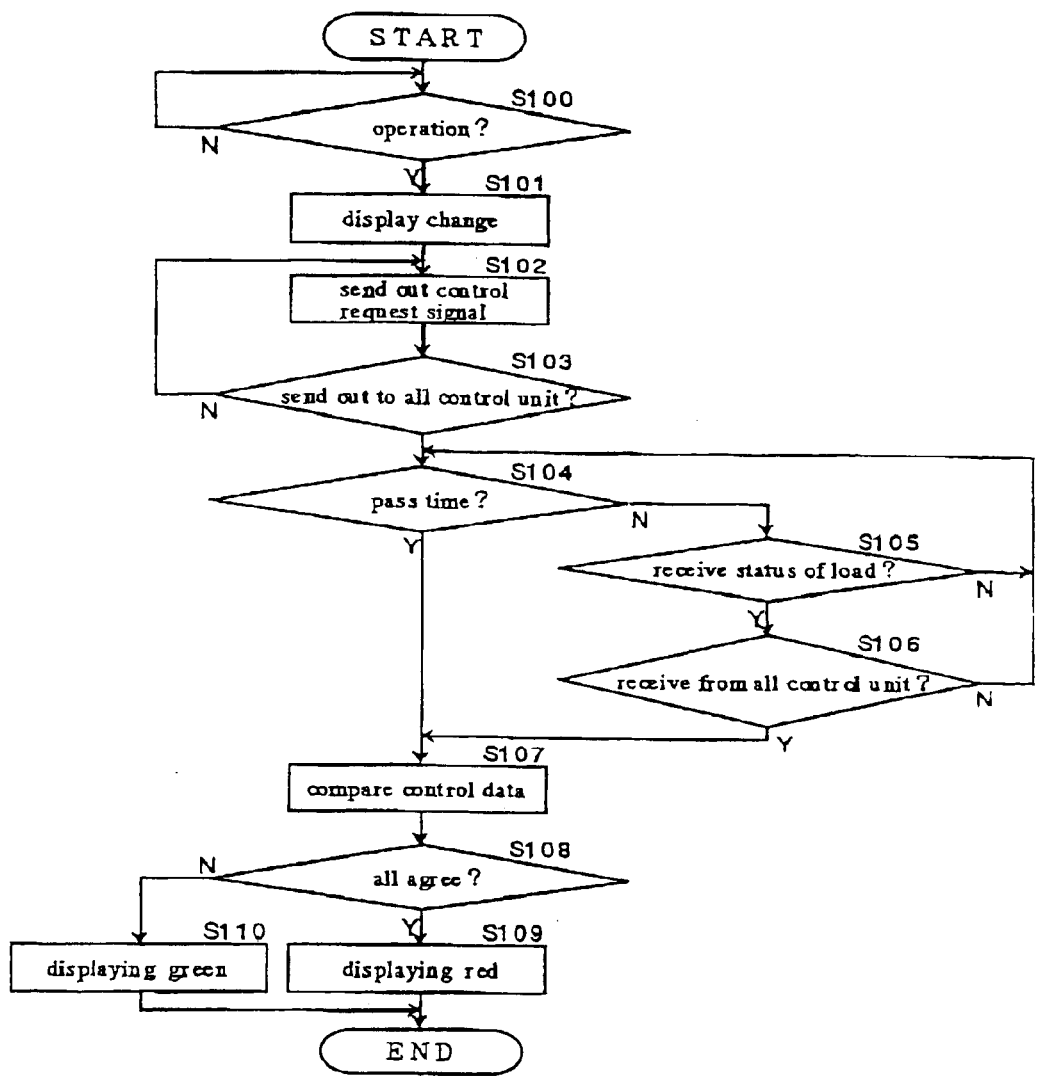
FIG. 14 is a flow chart showing one example of operations of an operation display unit.

In FIG. 14, one example of the movement of the above-mentioned operation display unit 5 is shown with a flow-chart (S10 to S110). If the operation section 53 is operated, a display is changed into an operation reaction display (for example, red) and an operation request signal is sent to all control units 2 (S100 to S103). Later, when all the load Status is received from a control unit 2 or even if all the load status is not received, after a fixed time is passed, the comparison of a control data is done (S104 to S107). As the result of comparison, if all agree, a red display is shown, and if not, a green display is shown (S108 to S110).

Figure 15:
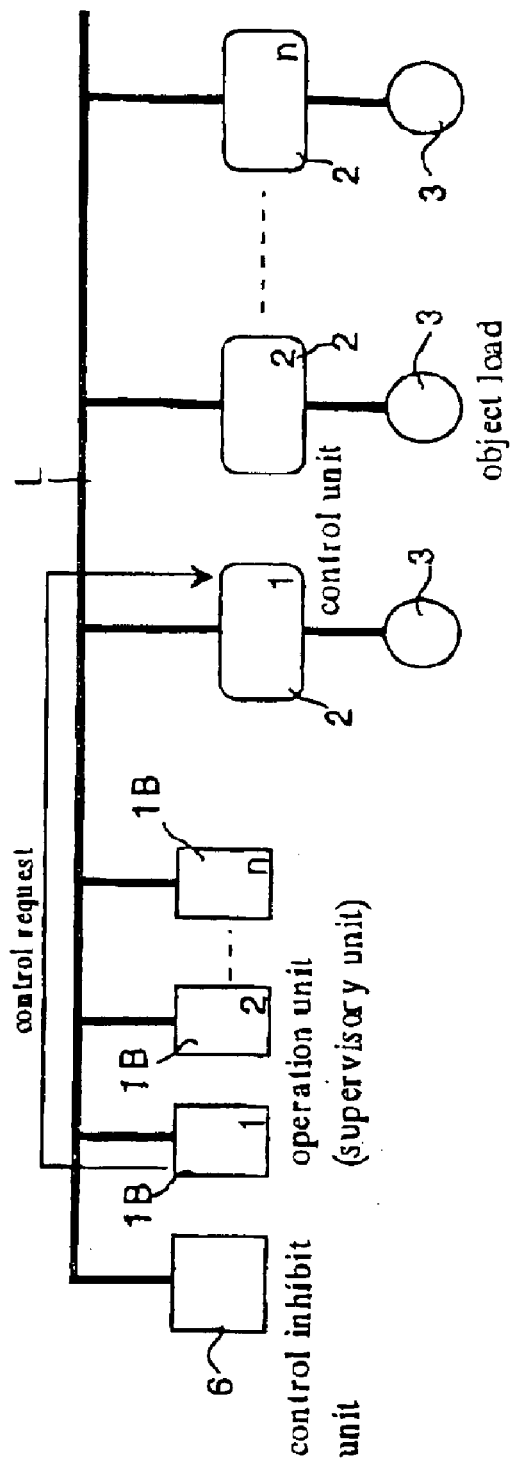
FIG. 15 is a diagram showing alternative embodiment of the configuration of a supervisory control system.
Figure 16:
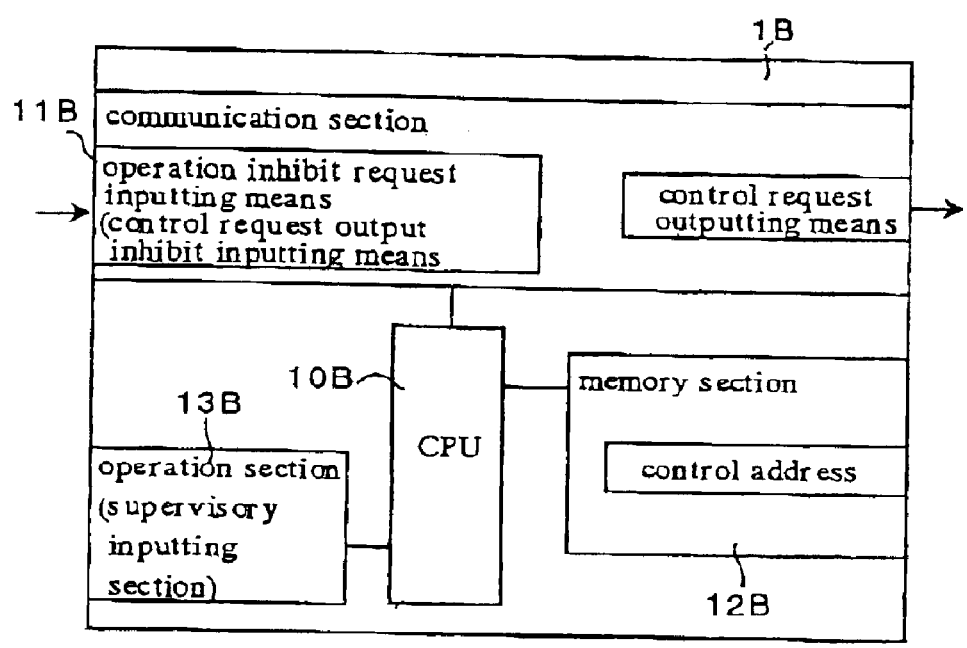
FIG. 16 is a block diagram showing alternative embodiment of the inner configuration of an operation unit.
Figure 18A:
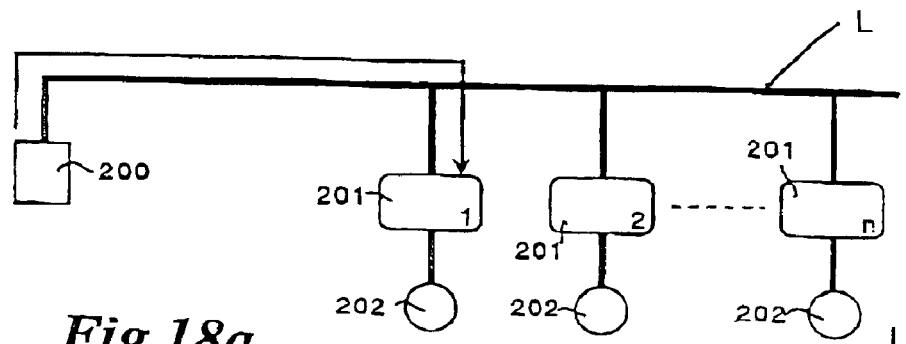
FIGS. 18a, 18b and 18c are diagrams showing alternative embodiment of a configuration and operation of a conventional supervisory control system.
Figure 18B:
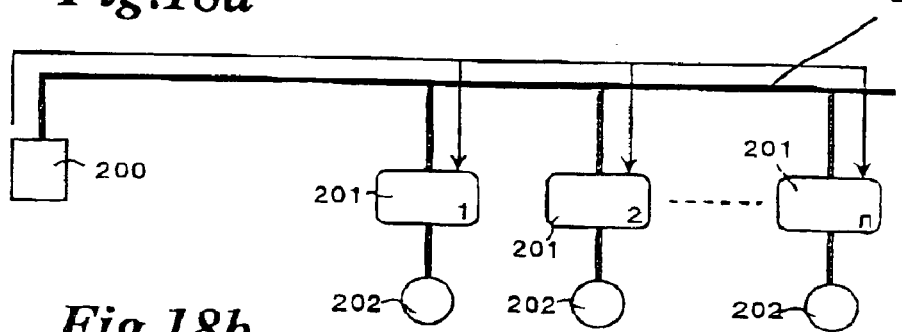
Figure 18C:
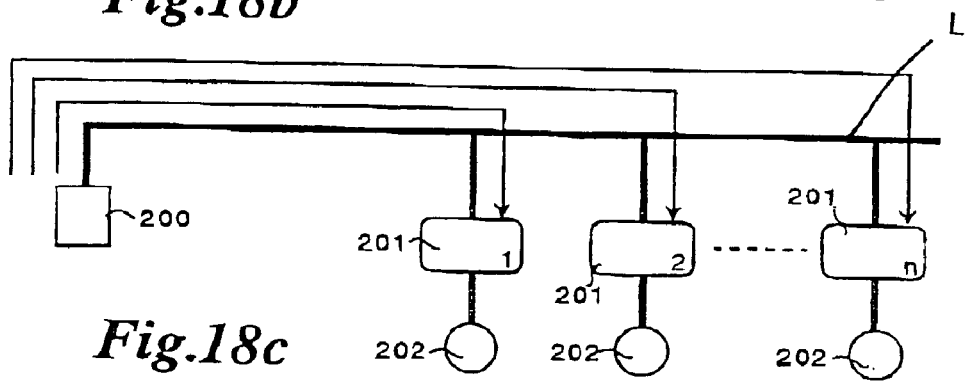
Figure 19:
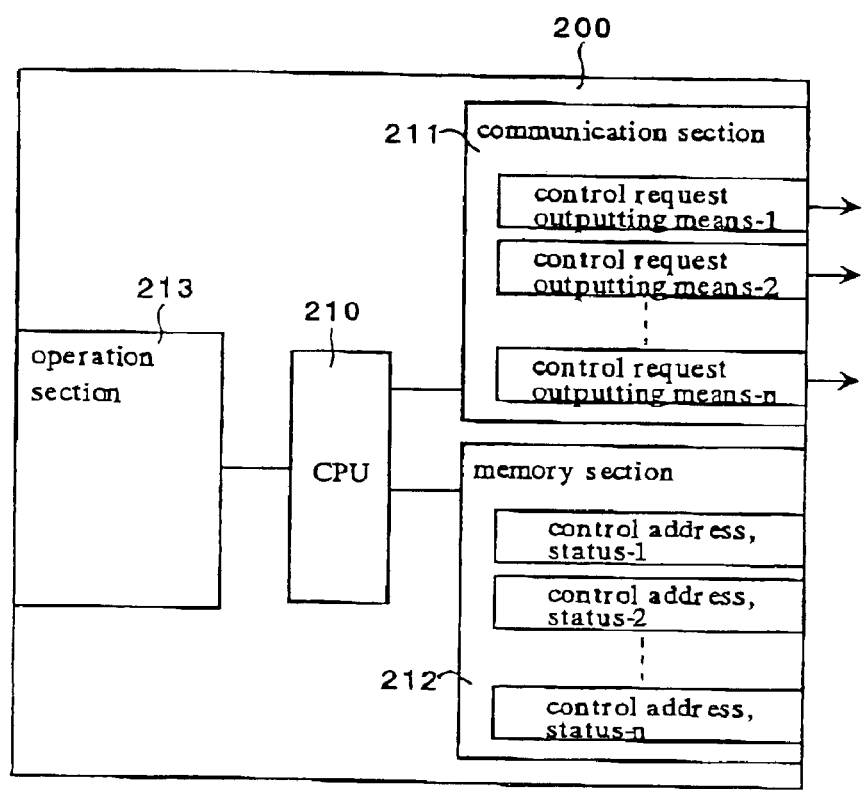
FIG. 19 is a diagram showing the inner configuration of conventional operation unit.

Next, an alternative constitution of a supervisory controlling system is shown in FIG. 15. FIG. 16 is a block diagram showing one example of the inside configuration of an operation unit of the system in FIG. 15. AS shown in FIG. 15, the supervisory control system is constituted of a plurality of operation units 1B, a plurality of control units 2 and a control inhibit units 6. They are connected with a communication line L and a object load 3 which is an object to be controlled is connected to each control unit 2.

As shown in FIG. 16, the operation unit 1B comprises a central processing section 10B formed of CPU, a communication section 11B for controlling communication via the communication line L, a memory section 12B and an operation section 13B for controlling the loads 3 connected with each one of the plurality of the control units. In the memory section 52, a destination address of a control request is memorized in advance. The communication section 11B and the central processing section constitute a communication/control processing section.

The communication/control section sends out via a communication line L the control request signals given addition with the communication address memorized in a memory section 12B. However, when an operation inhibit signal is received via the communication line L, the operation of the operation section is made invalid thus kept it under the condition that it is not allowed to send out an operation request signals till an operation permission signal is received.

For example, in a supervisory control system as shown in FIG. 15, the control unit 2 of the number "1" corresponds to the operation unit 1B of the number "1". A control request outputting means and an operation inhibit request inputting means are provided in the communication section 11B of the operation unit 1B.

When the operation section 13B is operated for on control the communication section 11B sends out an on-control request signal to the control unit 2 in accordance with the preset data memorized in the memory section 12B and thereby turning on the object loads 3, whereas the operation section 13B is operated for off control, the communication section 11B sends out an off-control request signal to the control unit 2 in accordance with the preset data memorized in the memory section 12B and thereby turning off the object loads 3, In this system, control for object loads can be inhibited depending on purpose of users' desire, namely when the operation section of the control inhibit unit 6 is operated, inhibit control signal is sent out to operation inhibit request inputting means of the operation unit 1B from the control inhibit unit 6.

The operation unit 1B is changed into the operation inhibit mode from normal mode and under the operation inhibit mode the operation for the operation section 13B is invalid and thereby its operation is imperfect.

On the other hand, such control inhibit is removed by sending operation permission signals to the operation inhibit request inputting means of the operation unit 1B, thereby the control inhibit mode changing into normal mode and the normal mode the object loads 3 can be controlled again. By this way, the operation of the operation unit 1B can be temporally inhibited and the operation of the operation unit 1B can be inhibited during specific period of time.

For example, by using such control inhibit function, it can be avoided to turn off the lighting equipment by mischief during business hours by the operation of the operation unit 1B provided at the places such as store buildings where the unspecific number of the general public go in and out.

It should be noted that control request outputting inhibition inputting means is provided in communication section 11B but a contact inputting method may be adopted in which the operation of the operation unit 1B is inhibited only when contacts are closed.

Because in the supervisory control system as shown in FIG. 15 a master unit like a conventional supervisory control system (see FIG. 17) isn't required to be provided, there is no fear that the master unit will get out of order or one trouble like the breaking off of the communication line around the master unit can paralyze the whole system.

Furthermore, the supervisory control system as shown in FIG. 15 may be constructed by connecting the supervisory unit to the communication line L as substitute for the operation unit 1B. The construction of the supervisory unit is the same as the operation unit 1B shown in FIG. 16 and the difference between both is that a supervisory inputting section is provided for judging the status of the object apparatus by inputting signals from the objective apparatus as substitute for the operation section 13B.

A communication/control processing section of the supervisory unit sends out via a communication line L control request signals given addition with the communication address memorized in a memory section 12B when judging the change of the status of the object apparatus into on status by inputting signals from the supervisory inputting section but after receiving control request outputting inhibition signals, input signal from the supervisory inputting section is made invalid and thereby being inhibited the sending out of the control request signal until the control request output permission signal is received.

In the memory section 12B of the supervisory unit, the communication address allocated to the respective control unit 2 to be controlled is memorized, and the communication section 11B is provided with control request outputting means and control request outputting inhibition means. When the status of the contact connected to the supervisory inputting section turns into on status from off status at a normal time, the communication section 11B sends on-control request signal to the control unit 2 in accordance with the preset addresses memorized in the memory section 12B and thereby the load 3 being controlled for changing on status. Furthermore, the status of the point of contact connected to the supervisory inputting section turns into off from on status, the communication section 11B sends out off-control request signal to the control unit 2 in accordance with the preset address memorized in the memory section 12B and thus a load 3 is controlled for changing off status.

When the inhibit control is desired, it is required to operate the operation section of the inhibit control unit 6 so that the control inhibit unit 6 sends out control inhibit request signal to the supervisory unit.

The supervisory unit is changed form normal mode into control request inhibit mode, when it receives this signal at the control inhibit request inputting section. As a result, control is made invalid if the status of the contact point of the supervisory inputting section is changed.

When the remove of control inhibit is desired, it is required to send control request input permission signal to the supervisory unit so that the supervisory unit receives this signal at the control inhibit request inputting section to return to the normal mode.

As a result, the object loads becomes controllable and by such this way, the output of control request signal from the supervisory unit is temporally inhibited or inhibited during specific period of time.

For example, it can be avoided to wrongly exceed a capacity of private power generation system by increasing lighting loads or driven loads during driving the minimum illumination or other equipment by a private generation system in case of an interruption of power supply.

A control request outputting inhibition inputting means is provided in the communication section 11B in the embodiment above-mentioned, however, a means of contact input may be employed, and in this means a control request output of the supervisory unit may be inhibited during the contact is closed.

As understood from the description, according to the operation unit or the supervisor unit of the present invention, object loads can be controlled in a manner of on/off patterning control by sending out only two group addresses to the communication line, which are divided for on controlled objects and off controlled objects in advance, and a control request signals. Therefore, even it small-scale operation units so constructed as to be installed at scattered necessary places are employed, a large-scale system with large amount of object loads can be easily built without increasing the cost of equipment and working, since the capacity for storing addresses is not required to be increased According to the operation unit or the supervisor unit of the present invention, since they can be connected each other in a manner of multi stage connection, thus when they are employed in such multi stage connection, a large-scale supervisory control system with large amount of object loads can be easily built without increasing the cost of equipment and working.

Further, in case of employing the units of the present invention in a manner of multi-stage connection, it can be easily control such system only operating or sending out control request signal to an operation unit or a supervisory unit as provided as a dominant one sides.

According to the display unit of the present invention, the comparison result data for complicated patterning control can be achieved even in a large-scale supervisory control system with large amount of object loads, by connecting the display units in a manner of multi stage connection For example, even when the display unit 4, although which is so constructed as to be installed in each room is small and low in cost but applied only to checking the controlled result for small scale system, they are easily applied to checking the controlled result for the large scale control system such as the whole floor or the whole building system, if they are connected to other display unit 4 which is provided as a dominant one at a common area like in the elevator hall and in the building entrance.

Also in case that the same comparison is executed, if the reference data for checking the controlled result is stored in the display unit 4 provided as a dominant one, the display unit provided as subdivided one can receive it and performed the same displaying.

According to the supervisory control system of the present invention, it can be easily applied to a large system with large amount of object loads can be applied by connecting the operation unit, the supervisory unit, or the display unit in a manner of multi stage connection.

Further, according to another operation display unit of the present invention, the operation display unit is changed into reaction display mode, when the operation section is operated or when control request signal is sent out, so that an operator can recognize the operation and is avoided to operation erroneously again.

Furthermore, according to another operation display unit the operation display immediately returns to the normal mode for displaying the comparison result when the status data is sent back for all the control units or when a predetermined period passes before the status data is sent back for all the control units, and especially immediately confirm even when the object loads does not finish correctly.

Moreover, according to another operation unit or another supervisory unit of the present invention, the operation of the operation unit or the interlock control of the supervisory unit with other apparatus to be supervised may be temporally set invalid or remove the invalid depending on purpose of users' or users' convenience and therefore they have advantage of convenience on use.

What is claimed is:

1. A supervisor unit connected via a communication line to a plurality of control units to which an object load is connected, said control units being divided into groups in advance, with group addresses allocated to respective groups, comprising:

a supervisory inputting section for judging the status of an objected load by input signal from said object load;

a memory section in which group addresses for an on-controlled object load and an off-controlled object load with respect to each of said control units to be controlled are stored related to each other in advance; and a communication/control processing section for sending out via the communication line a control request signal given an addition of said group address for on-controlled object load, or an addition of aid group address for off-controlled object load, when judging the change of said status of said object load into an on or off status by the input signal received at said supervisory inputting section.

2. A supervisory unit connected via a communication line to a plurality of control units to which object loads are connected, comprising:

a supervisory inputting section for judging the status of an object load by input signal from said object load;

a memory section in which the communication address and the corresponding control data with respect to each of said control units to be controlled are stored in advance; and a communication/control processing section for sending out via the communication line a control request signal given an addition of said address and said control data, when judging the change of the status of the object load into on or off status by the input signal received at said supervisory inputting section or when receiving other control request signals via the communication line.

3. A supervisory control system, comprising:

control units to which object loads are connected and said operation display unit is provided which includes: a display section for displaying the status of object loads connected to the control units; a memory section in which the communication address and the corresponding status data with respect to each of the control units, and a destination address of other display sections, or other supervisory units are stored; and a communication/control processing section for comparing said status data received from ech of the control units and said status data stored in said memory section, when receiving said status data from each of the control units having been controlled via the communication line to display the comparison result as the comparison result data on said display section, and for sending out a control request signal given an addition of said destination address of said other display units or other supervisory units to the communication line; and said supervisory unit having a supervisory inputting section for judging the status of an object load by an input signal from said object load; a memory section in which the communication address and the corresponding control data with respect to each of said control units to be controlled are stored in advance; and a communications/control processing section for sending out via the communications line a control request signal given an addition of said address and said control data, when judging the change of the status of the object load into on or off status by the input signal received at said supervisory inputting section or when receiving other control request signals via the communications line, connected to each other via the communication line, wherein:

said operation display unit and/or said supervisory unit send out said control request signal to other operation units or other supervisory units via the communication line, when it/they receives/receive a control request signal via the communication line.

4. A supervisory control system, comprising:

a plurality of control units to which object loads re connected; and said operation display unit having a display section for displaying the status of object loads connected to the control units; a memory section in whic the communication address and the corresponding status data with respect to each of the control units, and a destination addresses of other display sections, or other supervisory units are stored; and a communications/control processing section for comparing said status data received from each of the control units with said status data stored in said memory section, when receiving said status data from each of the control units having been controlled via the communication line to display the comparison result as the comparison result data on said display section, and for sending out a control request signal given an addition of said destination address of said other display units or other supervisory units to the communication line connected to each other via a communication line, wherein:

said operation display unit sends out comparison result data to other operation display units connected to the communication line, when it receives the status data of said object load from said control unit via the communication line.

5. A supervisory control system comprising:

control units to which object loads are connected; and an operation display unit having an operation section for controlling said object loads connected to each of said plurality of control units; a display section for displaying the status of said object loads connected to said control units; a memory section in which the communication address and the corresponding control data with respect to each of said control units are stored in advance; and a communication/control processing section for sending out a control request signal given an addition of said communication address and the corresponding control data stored in said memory section to the communication line and for comparing said status data of said object loads received from each of said control units with said corresponding control data stored in said memory section, when receiving said status data from each of said control units having been controlled by said operation display unit via the communication line and for thereafter displaying the comparison result as the comparison result data on said display section, connected to each other via a communication line, wherein:

said control unit comprises a control section for controlling said object loads; a memory section in which a communication address of said control unit are stored in advance; a supervisory section for supervising the status of the object loads; a communication/control processing section for controlling said object loads when receiving a control signal via the communication line and for detecting the status of object loads having been controlled to send out the status data of said loads given an addition of said communication address stored in said memory section; and said operation display unit being changed into a reaction display mode when it sends out a control request single given an addition of the communication address and the corresponding data with respect to said control unit to be controlled by operation of said operation section and thereafter displaying comparison result data obtained from comparison of said status data of said object loads with said corresponding control data.

6. A supervisory unit connected via a communication line to a plurality of control units to which object loads re connected, comprising:

a supervisory inputting section for judging the status of an object load by input signal from said object load;

a memory section in which the destination address for control request signal is stored in advance; and a communication/processing section for sending out via the communication line a control request signal given an addition of said destination address, when judging the change of said object apparatus into an on or off status by the input signal received at said supervisory inputting section and for invalidating the operation of said operation section when receiving operation inhibit signal via the communication line and for removing said invalidation to permit to send out said control request signal when receiving an operation permission signal.

* * * * *

UNITED STATES PATENT AND TRADEMARK OFFICE
CERTIFICATE OF CORRECTION

PATENT NO.    : 6,895,284 B2
DATED         : May 17, 2005
INVENTOR(S)   : Kazushige Morita It is certified that error appears in the above-identified patent and that said Letters Patent is hereby corrected as shown below:

Column 17,
Line 50, "objected" should be -- object --.
Line 60, "aid" should be -- said --.

Column 18,
Line 24, "ech" should be -- each --.
Line 54, "re" should be -- are --.
Line 58, "whic" should be -- which --.

Column 20,
Line 19, "re" should be -- are --.

Signed and Sealed this

Seventh Day of February, 2006

JON W. DUDAS
*Director of the United States Patent and Trademark Office*